Dec. 2, 1952     F. F. SIEBERT     2,619,763

WEEDLESS FISHING LURE

Filed Jan. 20, 1947

INVENTOR.
Fred F. Siebert
BY
Gary, Desmond & Parker
Attorneys.

Patented Dec. 2, 1952

2,619,763

UNITED STATES PATENT OFFICE 2,619,763

WEEDLESS FISHING LURE

Fred F. Siebert, Chicago, Ill.

Application January 20, 1947, Serial No. 723,119

2 Claims. (Cl. 43—42.43)

The present invention relates to a weedless fishing lure.

The primary object of the invention concerns itself with a weedless and snagproof fishing lure, suitable for catching fish, by casting or trolling said fishing lure through weeds, without the said lure becoming entangled. The said weedless fishing lure being so constituted that the fish hook attached to the said lure, and the retrieving eye attached to said lure are so constructed that by fastening one end of an elastic or rubber band to the said retrieveing eye of said lure and the other end of the said elastic or rubber band is then pulled to the barb of said fish hook attached to said lure and fastened thereto, thus producing an elastic barrier from the barb of said fish hook to the said retrieving eye of said fishing lure, thus protecting the point of said fish hook attached to said lure from becoming hooked onto weeds, etc.

The retrieving eye and the fish hook of said weedless fishing lure are so constructed that the said rubber band can be readily removed or replaced.

The second object of the invention concerns itself with a weedless fishing lure, and may be broadly stated to comprise a shaped piece of material such as wood, plastic or metal, to which is attached a fish hook. The said fish hook is so attached to said lure that the point of said fish hook is parallel to the retrieving eye of said lure. The said retrieving eye is attached to the front end of said lure to which one end of a rubber band is attached, the other end of said rubber band being pulled to the barb of said fish hook and fastened thereto, thus producing an elastic barrier over the point of said fish hook to the retrieving eye of said weedless fishing lure.

For complete understanding of the present invention reference is directed to the drawings, in which Fig. 1 is a side elevational view of a fishing lure embodying the invention.

Figure 1:
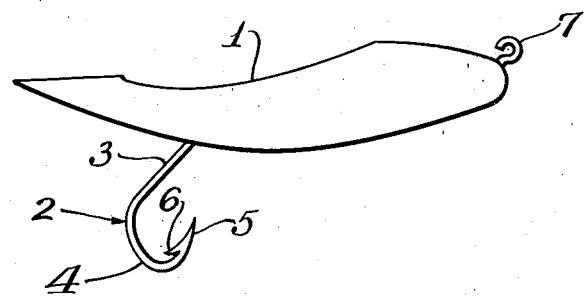
Figure 2:
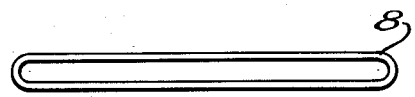
Fig. 2 is a bottom view of a rubber band.

Referring in detail to the drawing, 1 indicates a lure body which is constructed of such material as wood, plastic or metal and is shaped somewhat as shown in the drawing. A pointed fish hook 2 is positioned upon the body 1 with a portion of the shank 3 of the hook embedded in the body and the point of the hook being directed toward said body. The shank 3 extends rearwardly and downwardly from the body and is curved intermediate its length, as at 4 in Figs. 1 and 3, the curved portion extending downwardly, forwardly and upwardly along its length, terminating in a pointed portion 5 having a barb 6 disposed adjacent to, rearwardly from, and at an angle to the pointed portion of the hook. A retrieving eye 7 is carried at the forward end of the body to which a fish line may be secured.

Figure 3:
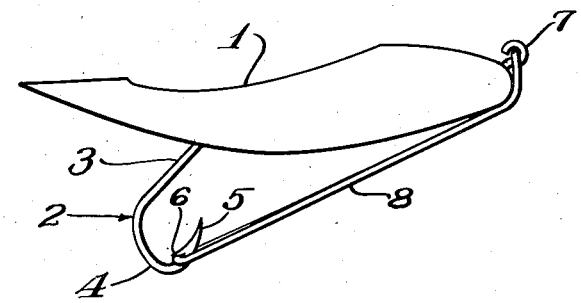
Fig. 3 is a view similar to Fig. 1 illustrating the rubber band in operative position.

As an object of my invention a rubber band is looped, at one end, through the eye as an anchorage 7 and may be hooked, at the other end under the barb 6, the thickness of said band being entirely included between said barb and the curved portion of the hook and the stretched band thus producing an elastic barrier over the point 5 of the fish hook 2 as will be noted by reference to Fig. 3 wherein it is shown that the pointed portion of the hook is disposed at an angle to the length of the rubber band and that said angle diverges away from the point of engagement of the band and the hook, and the point of the hook is positioned within the confines of the body, the band and the shank of the hook.

I claim:

1. A fishing lure comprising a lure body, a pointed fish hook having a portion of its shank embedded in said body, the point of the hook being directed inwardly toward said body, a barb upon said fish hook disposed adjacent to and at an angle to the pointed portion of the hook, an anchorage carried by said body, and endless rubber band secured at one end to said anchorage, the opposite end of said band being engageable between said barb and the curved portion of said hook, the thickness of said band being entirely included between said barb and the curved portion of said hook, and the pointed portion of said hook being disposed at an angle to the length of said rubber band when the latter is engaged by said barb, said angle diverging away from the point of engagement of the band and the hook, and the point of the hook being positioned within the confines of said body, said band and the shank of the hook.

2. A fishing lure comprising a lure body having a front portion and a rear portion, a pointed fish hook having a portion of its shank embedded in said body adjacent said rear portion, a barb upon said fish hook disposed adjacent to, and rearwardly of the pointed portion of the hook, said barb being disposed at an angle to the pointed portion of said hook, an anchorage carried by said body adjacent its front portion, an endless rubber band secured at one end to said anchorage, the opposite end of said band being engageable between the barb and the curved portion of the hook, the thickness of the band being entirely included between the barb and the curved portion of the hook, the pointed portion of the hook being directed inwardly toward said body and disposed at an angle to the length of the band, the shank of the hook and the pointed portion of the hook diverging with respect to the length of the band from the point of engagement of the hook and the band and the hook point being positioned within the confines of said body, said band and the shank of the hook, and said band deflecting engageable material in the water from the pointed portion of the hook when the lure body moves forwardly.

FRED F. SIEBERT.

REFERENCES CITED

The following references are of record in the file of this patent:

UNITED STATES PATENTS

| Number | Name | Date |
|---|---|---|
| 539,149 | Shattuck | May 14, 1895 |
| 784,942 | Henckler | Mar. 14, 1905 |
| 889,356 | Carpenter | June 2, 1908 |
| 1,191,031 | Peters | July 11, 1916 |
| 1,406,834 | Fisher | Feb. 14, 1922 |
| 1,890,400 | Miller | Dec. 6, 1932 |
| 2,218,280 | Deering | Oct. 15, 1940 |
| 2,315,440 | McArthur | Mar. 30, 1943 |
| 2,402,853 | Sweeney | June 25, 1946 |